(12) United States Patent
Burgener et al.

(10) Patent No.: US 6,431,345 B2
(45) Date of Patent: Aug. 13, 2002

(54) HIGH SPEED BOARD FEEDER

(75) Inventors: Jerry A Burgener, Hot Springs; Timothy C. Efird, Malvern, both of AR (US)

(73) Assignee: U.S. Natural Resources, Inc., Vancouver, WA (US)

( * ) Notice: Subject to any disclaimer, the term of this patent is extended or adjusted under 35 U.S.C. 154(b) by 0 days.

(21) Appl. No.: 09/732,449

(22) Filed: Dec. 5, 2000

Related U.S. Application Data

(63) Continuation-in-part of application No. 09/338,789, filed on Jun. 23, 1999, now abandoned.

(51) Int. Cl.⁷ .............................................. B65G 47/31
(52) U.S. Cl. ............................. 198/461.3; 198/459.5; 198/463.5; 198/476.1
(58) Field of Search .................. 198/461.3, 459.5, 198/463.5, 460, 476.1

(56) References Cited

U.S. PATENT DOCUMENTS

| | | | |
|---|---|---|---|
| 4,646,909 A | 3/1987 | vom Stein | 198/460 |
| 4,863,154 A | 9/1989 | Hirakawa | 271/176 |
| 4,869,360 A | 9/1989 | Brown | 198/460 |
| 4,962,844 A | 10/1990 | Francioni | 198/460 |
| 5,518,106 A | 5/1996 | Allard | 198/459.5 |
| 5,584,747 A | 12/1996 | Ikeda | 451/83 |
| 5,662,203 A | 9/1997 | StPierre et al. | 198/463.5 |
| 5,813,512 A | 9/1998 | Andersson | 198/459.5 |
| 5,890,579 A | 4/1999 | Young | 198/459.6 |
| 5,921,376 A | 7/1999 | Michell | 198/476.1 |
| 6,024,204 A | 2/2000 | vanDyke, Jr. et al. | 198/459.6 |

Primary Examiner—Christopher P. Ellis
Assistant Examiner—Rashmi Sharma
(74) Attorney, Agent, or Firm—Robert L. Harrington; Schwabe, Williamson & Wyatt, P.C.

(57) ABSTRACT

A high speed board feeder for transferring boards from an infeed conveyor onto a secondary conveyor. The boards on the infeed conveyor are transported in an edge to edge configuration against a fixed stop. Hold down mechanism is provided to secure the boards in the desired orientation. A cam member timed to the secondary conveyor has lobes that engage and lift the board that is against the positive stop. The lobes lift the board upward and over the positive stop. The board is forced onto the secondary conveyor by the conveying force of the preceding boards. The board is placed on the secondary conveyor between successive drive lugs. A pivotal stop arm is provided to interrupt the feeding of boards from the infeed conveyor to the secondary conveyor.

8 Claims, 6 Drawing Sheets

HIGH SPEED BOARD FEEDER

This is a continuation in part of U.S. Ser. No. 09/338,789 filed Jun. 6, 1999 now abandoned.

FIELD OF THE INVENTION

This invention relates to lumber processing and more particularly to a transfer mechanism which transfers boards from a conveyor conveying boards in adjacent relationship onto a conveyor that receives and conveys the boards in a desired fixed relationship.

BACKGROUND OF THE INVENTION

Lumber processing is highly automated and in certain processing stations, the boards need to be precisely spaced apart when entering the station. To achieve this spaced relationship, the boards are commonly transferred from a conveyor where the boards are in close or abutting relationship, e.g., as when coming from an unscrambler, onto a second conveyor having lugs that determine the desired spacing. A transfer mechanism controls the transfer from one conveyor onto the other to assure the relationship desired. This invention is directed to such transfer mechanism.

A typical transfer mechanism employs an intermediate pick off wheel and a stop member. The board movement is stopped on the first conveyor (although the conveyor typically continues to slide under the boards) and each leading board in turn is picked off the first conveyor by the pick off wheel and carried over onto the next conveyor in timed sequence.

The mechanism of such prior transfer mechanisms is complex, slower than desired, subject to misfeeding of the boards and expensive. The present invention is directed to greater speed, greater accuracy, is simpler in design and less expensive.

BRIEF DESCRIPTION OF THE INVENTION

In a first preferred embodiment, the first conveyor is provided with a descending discharge end that is closely adjacent to and elevated over the receiving end of a second conveyor. A downwardly angled fixed slide member fills the gap between the conveyors and directs the boards off the discharge end of the first conveyor and toward the receiving end of the second conveyor. A fixed stop is provided on the slide and interrupts the movement of the board. The stop is positioned just above the end sprocket of the second conveyor. A camming wheel or member mounted to the shaft of the end sprocket of the receiving conveyor rotates with the end sprocket. Camming lobes on the wheel are strategically positioned to rise up under a leading board edge abutted against the stop and raises that board edge over the stop. The downward urging of the following boards pushes the board over the stop and onto the second conveyor. The lobes of the camming wheel or member are arranged on the wheel relative to the lugs on the second conveyor so that the boards are deposited on the second conveyor between the lugs.

A secondary stop in the form of a pivotal arm is provided to selectively stop the advancement of the boards prior to the fixed stop and nullifies the cam feeding of the boards. This allows the second conveyor to operate, e.g., to empty the second conveyor. The boards descending down the path of the first conveyor end and the slide are preferably biasingly urged to lay flat on the conveyor and slide until engaged by the lobes of the camming wheel or member.

A further embodiment believed to be an improvement over the above first preferred embodiment dispenses with the slide member. The further embodiment retains the descending discharge end of the first conveyor and effectively overlaps the two conveyors to enable the direct transfer of the boards onto the second conveyor from the first conveyor. A stop member stops the conveyance of the boards just prior to the overlap position and a camming wheel, similar to that of the first preferred embodiment, sequentially lifts the leading edge of the leading board over the stop for deposit onto the second conveyor.

These and other features and benefits of the invention will be more fully appreciated upon reference to the following detailed description and the drawings referred to therein.

DESCRIPTION OF THE PREFERRED EMBODIMENT

Figure 1:
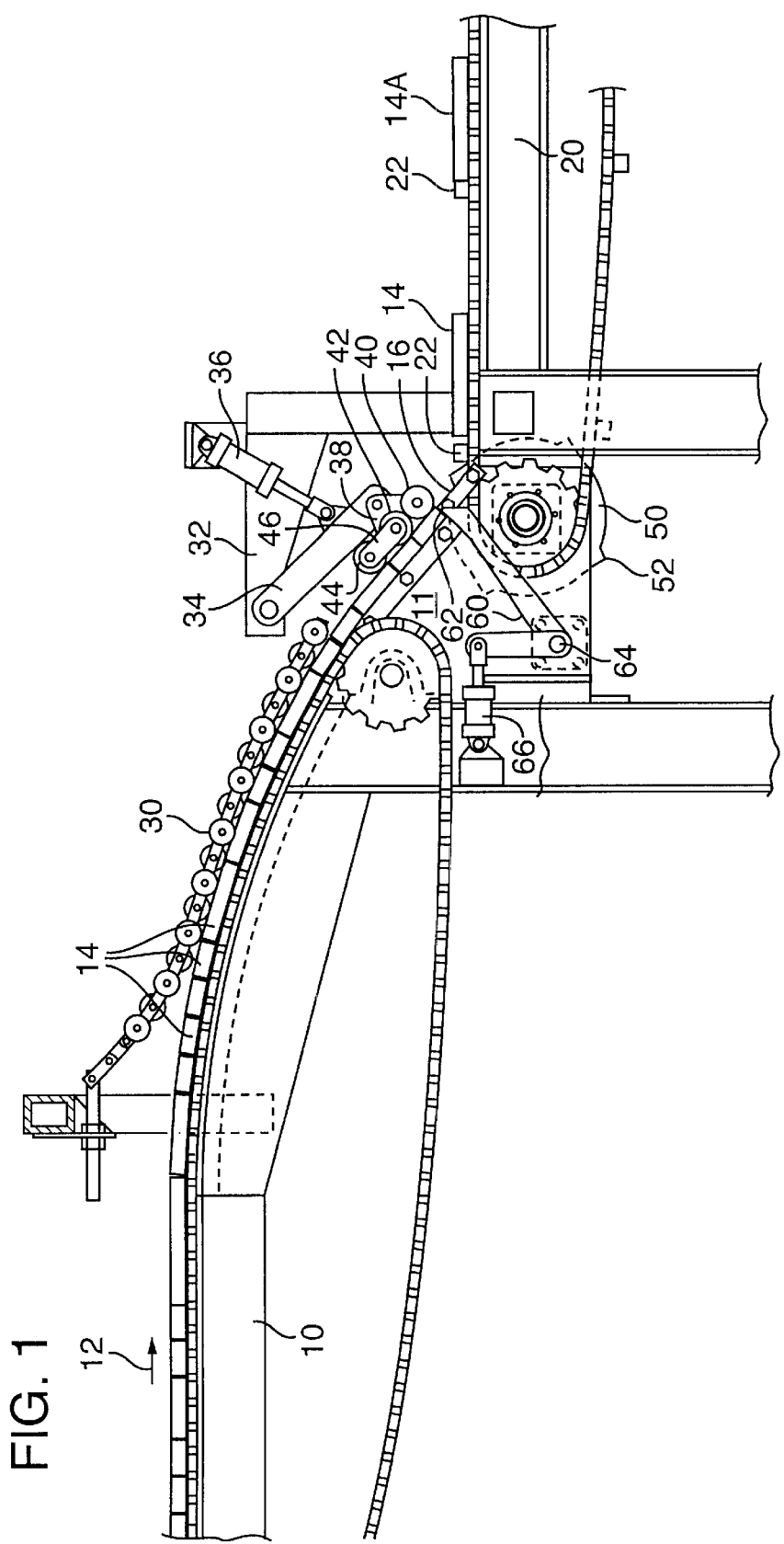
FIG. 1 is a side view of a board feeder of the present invention.
Figure 2:
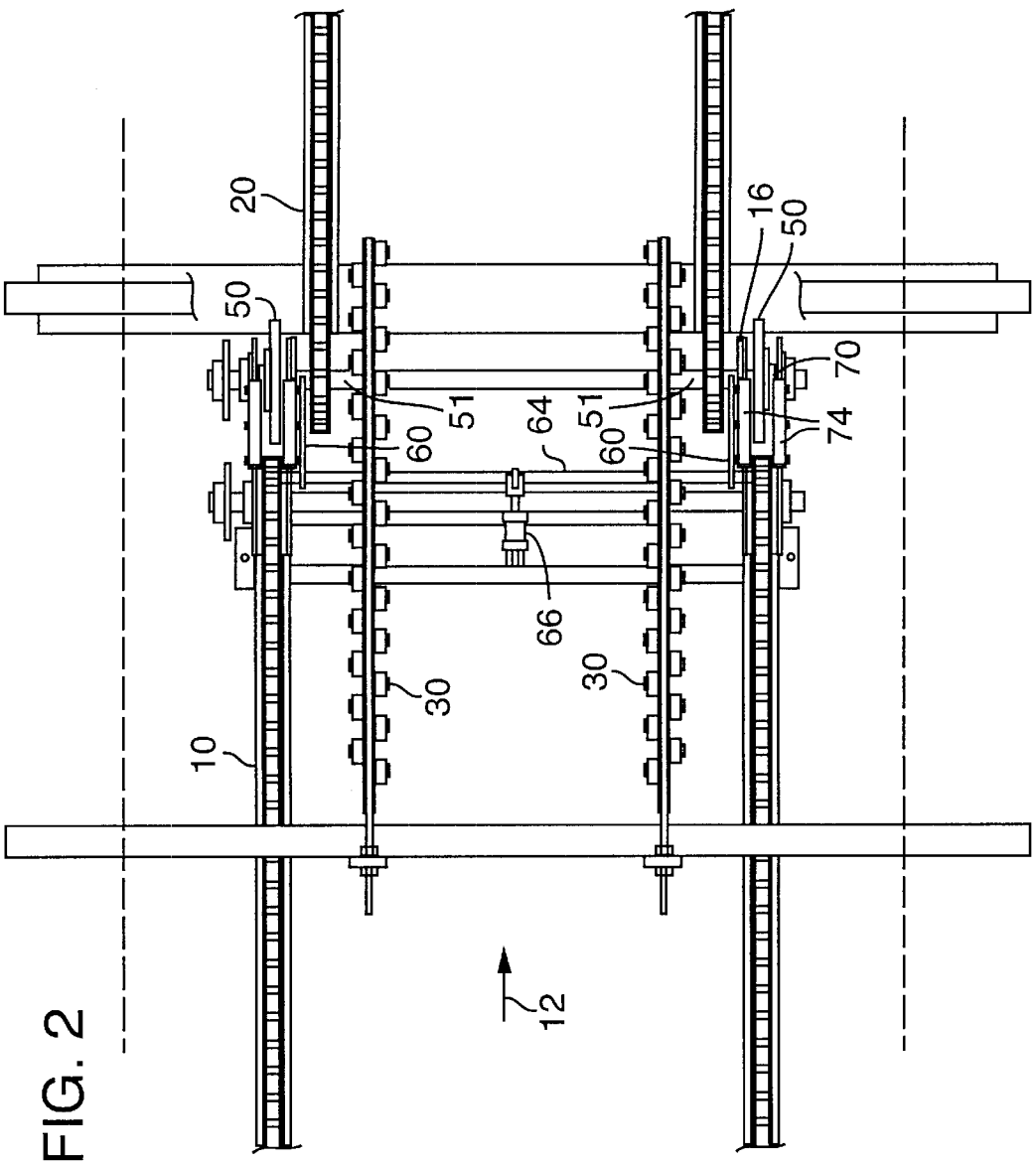
FIG. 2 is a top plan view of the board feeder of FIG. 1.

FIGS. 1 and 2 illustrate a board feeder for a lumber processing line. The processing line has an infeed conveyor 10 that conveys boards in the direction indicated by arrow 12 with the boards being abutted in an edge-to-edge arrangement. The conveyor 10 is a chain type conveyor with the discharge end radiused to provide a descending array of boards. The boards, hereafter referred to as boards 14 or simply as board 14, are transported by the infeed conveyor 10 onto a fixed slide 11. The boards 14 engage a positive stop 16 mounted on the slide 11 which stops the motion of the boards 14. The chain of the conveyor 10 continues to travel with the chain simply sliding under the boards received thereon. The boards 14 are to be separated or spaced one from the other and transferred to a secondary conveyor 20 with each board 14 on the secondary conveyor 20 being placed between successive drive lugs 22. The drive lugs 22 will engage the trailing side edge of each of the boards 14 and transport the boards to a subsequent operation.

The boards 14 are held in position behind the stop 16 with the aid of a drag roller assembly 30 and a hold down mechanism 32. The drag roller assembly 30 and the hold down mechanism 32 assure that the boards 14 will remain in an edge-to-edge contact on the slide 11 and will prevent one board 14 from flipping upwardly to be deposited on a previous or subsequent board. The hold down mechanism 32 has an arm 34 that is pivotally mounted and biasingly controlled by a cylinder 36. A bracket 38 is pivotally mounted on the arm 34 and supports rollers 40, 42. An additional roller 44 is coupled to the trailing roller 42 by a bracket 46. The hold down mechanism thus provides a biasing force through the rollers 40, 42 and 44 to hold the boards 14 downwardly on the conveyor 10 and against the stop 16. The pivotal bracket 38 does, however, permit the leading board 14 to be lifted above the fixed stop 16 to transfer the board 14 onto the secondary conveyor 20.

Figure 3:
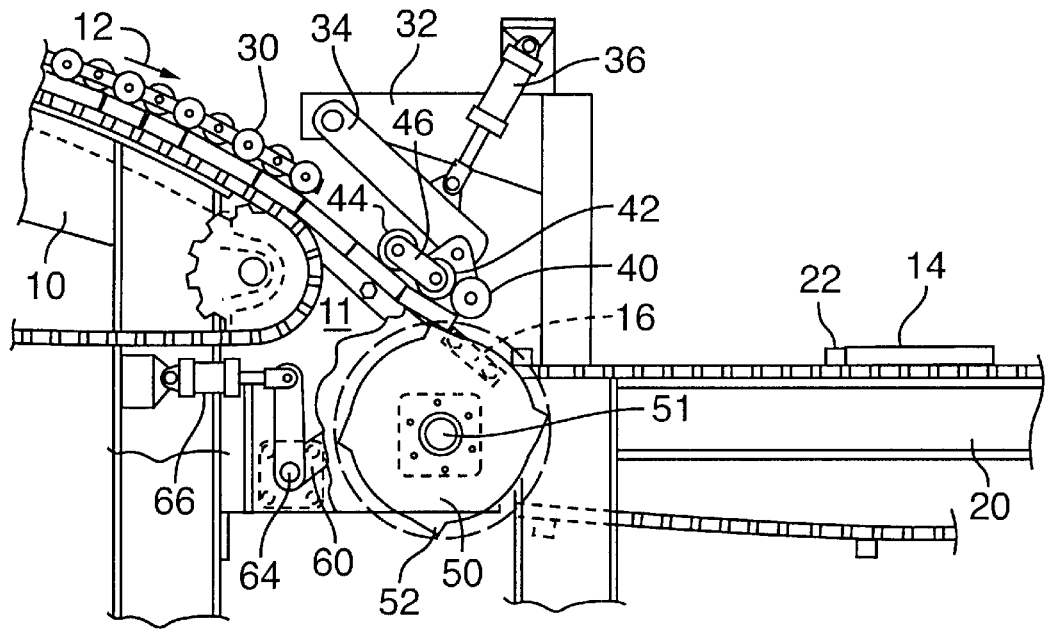
FIG. 3 is a view similar to FIG. 1 illustrating a board being transferred onto a secondary conveyor.

Cam members 50, which are mounted on gear shaft 51 of secondary conveyor 20 are accordingly timed to rotate with movement of the secondary conveyor 20. The cam member 50 lifts the leading edge of the board that is against the fixed stop 16 upwardly and over the fixed stop 16. Lifting of the board edge is provided by extending lobes 52 on the cam member 50 which will engage the leading edge of the board 14 that is against the fixed stop 16 and elevates the leading edge of that board 14 over the fixed stop 16. FIG. 3 illustrates the cam member 50 in the process of elevating the leading edge of the board 14 that was positioned against the fixed stop 16. The force of the preceding boards 14 acting against the leading board 14 (being urged by conveyor 10 and gravity) will force the leading board 14 that has been lifted above the stop 16 off slide 11 and onto the secondary conveyor 20.

Figure 5:
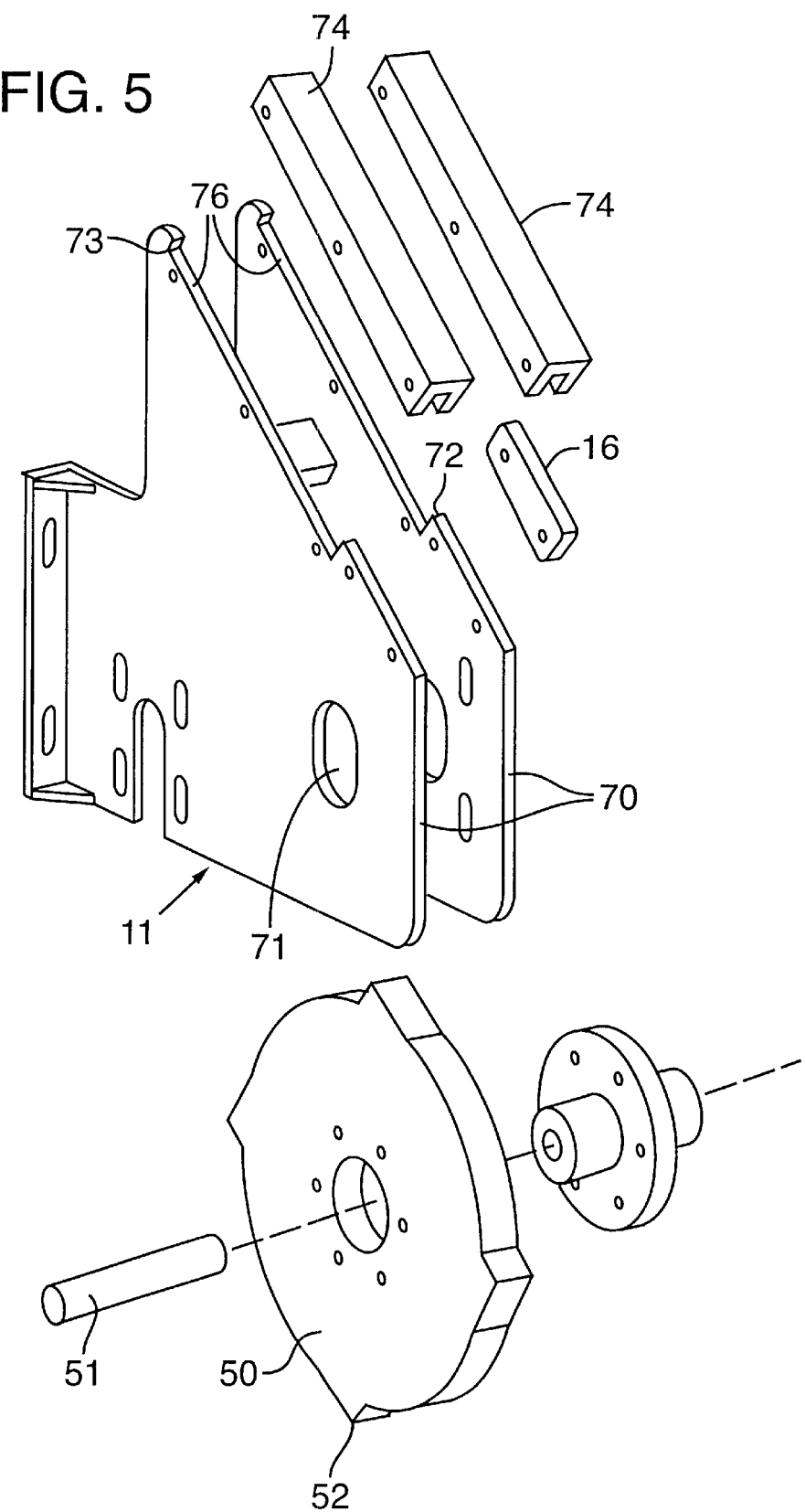
FIG. 5 is an exploded view of a portion of the board feeder.

The cam member 50 and the slide 11 including positive stop 16 are further illustrated in FIG. 5. The cam member 50 has extending tapered lobes 52 spaced around its periphery. The cam member 50 is mounted on shaft 51 and positioned between brackets 70 as permitted by oversize slots 71 strategic to the positive stop 16. A shoulder 72 on the brackets 70 defines the position of the positive stop 16. A replaceable stop member 16 is mounted substantially flush with the shoulder 72 on the bracket 70. Replaceable slide inserts 74 are provided on the land 76 between shoulder 73 and shoulder 72. The inserts 74 fit below the top edge of shoulder 72 with stop 16 projected above the inserts 74 as will be apparent. As will be noted, the stop 16 and the inserts are replaceable.

Figure 4:
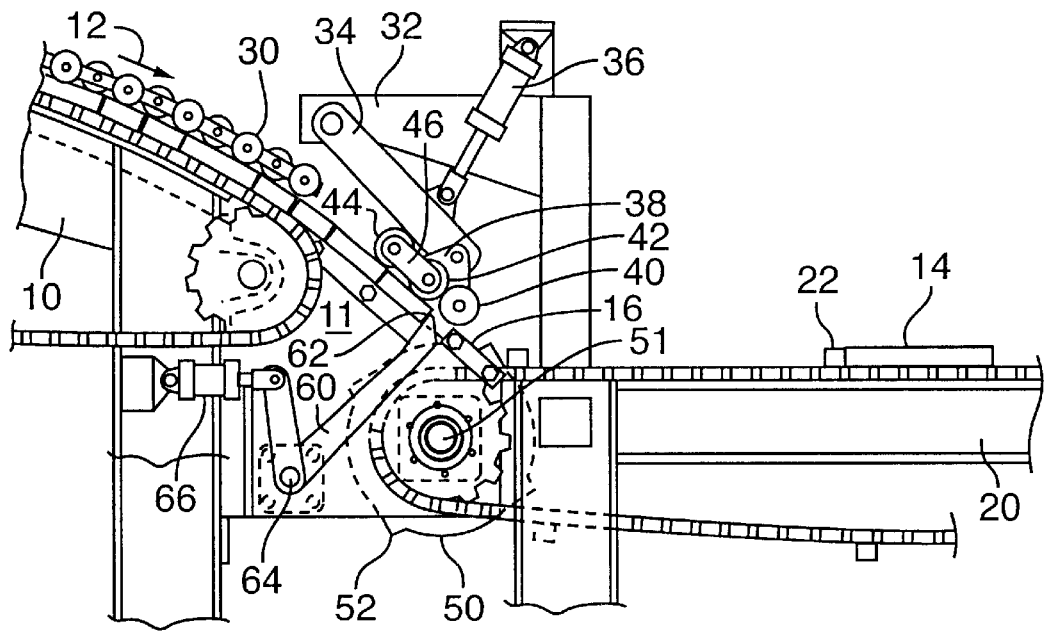
FIG. 4 is a view similar to FIG. 1 illustrating the manner of interrupting the feed of the board.

A stop arm 60 (FIG. 4) mounted near each cam member 50 is provided to interrupt the feeding of the boards 14 from the infeed conveyor 10 to the secondary conveyor 20. The stop arms 60 are mounted to a common shaft 64. A cylinder 66 coupled to the shaft 64 pivots the stop arms 60 to their two pivotal positions. One pivotal position is shown in FIG. 1 and the other pivotal position is shown in FIG. 4. As seen in FIG. 4, the stop arm 60 has been pivoted away from the positive stop so that the tip 62 of the arm 60 stops the boards before they reach the positive stop 16. The edge of the first board 14 in abutment against the tip 62 is out of the travel path of the lobe 52 of the cam 50. The board 14 will not be engaged by the lobe 52 and the feeding of the boards 14 is interrupted.

During a feeding operation the arm 60 is positioned so that the tip 62 is substantially flush with the fixed stop 16 (FIG. 1). When the cam member 50 rotates, the lobe 52 will engage the leading edge of the board 14 that is against the stop 16. Continued rotation of the cam member 50 will elevate the leading edge of the board 14 above the fixed stop 16.

As the leading edge of the board 14 is being elevated by the lobe 52 of the cam 50, the bracket 38 will pivot on the arm 34 and the leading roller 40 will elevate with the board 14. The second roller 42 will also pivot and remain in contact with the trailing edge of the board 14 and will engage the leading edge of the next board 14 to assure that it will come into abutment with the fixed stop 16.

Figure 6:
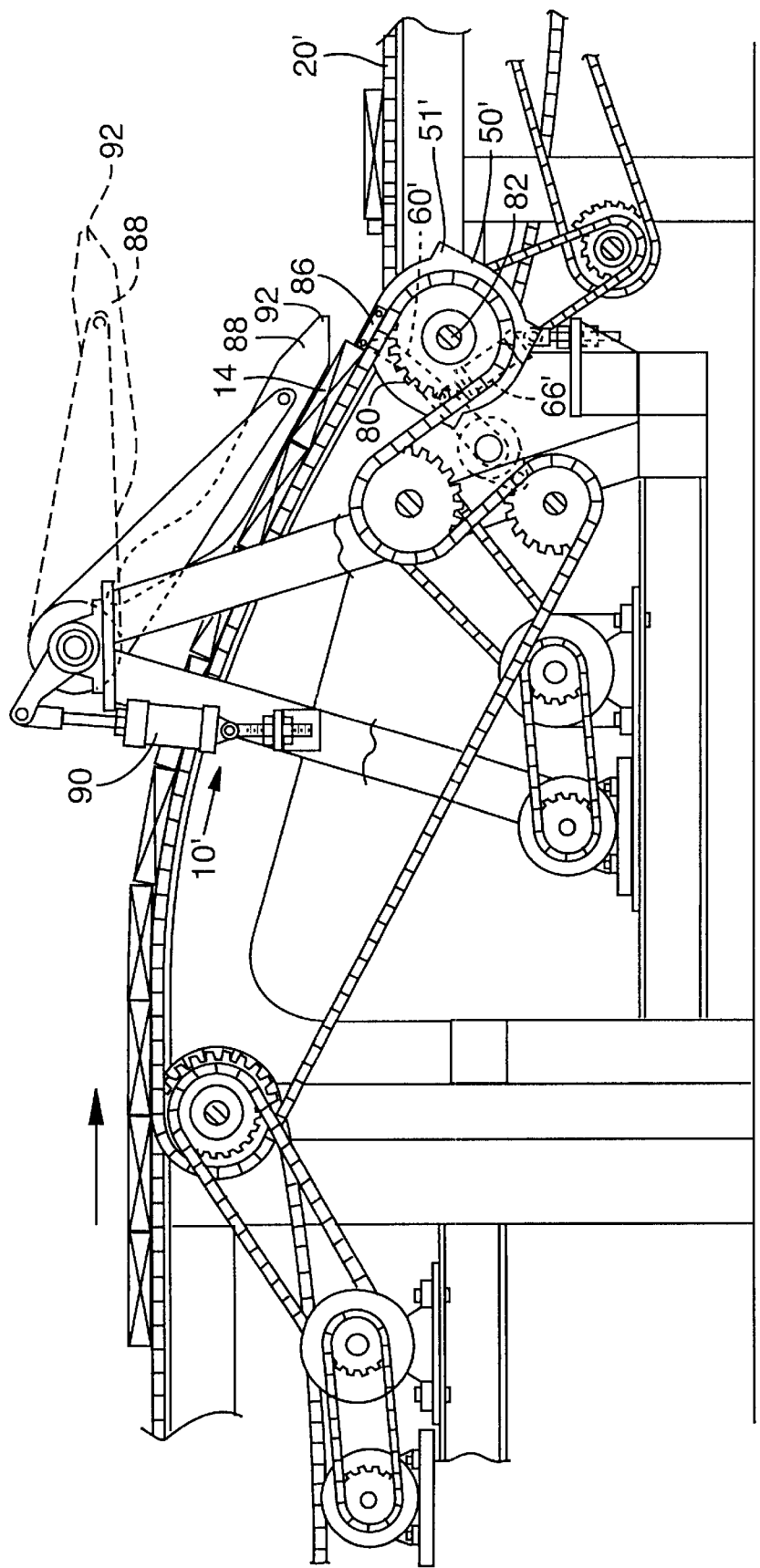
FIGS. 6 and 7 are side and plan views of a further embodiment of the invention.
Figure 7:
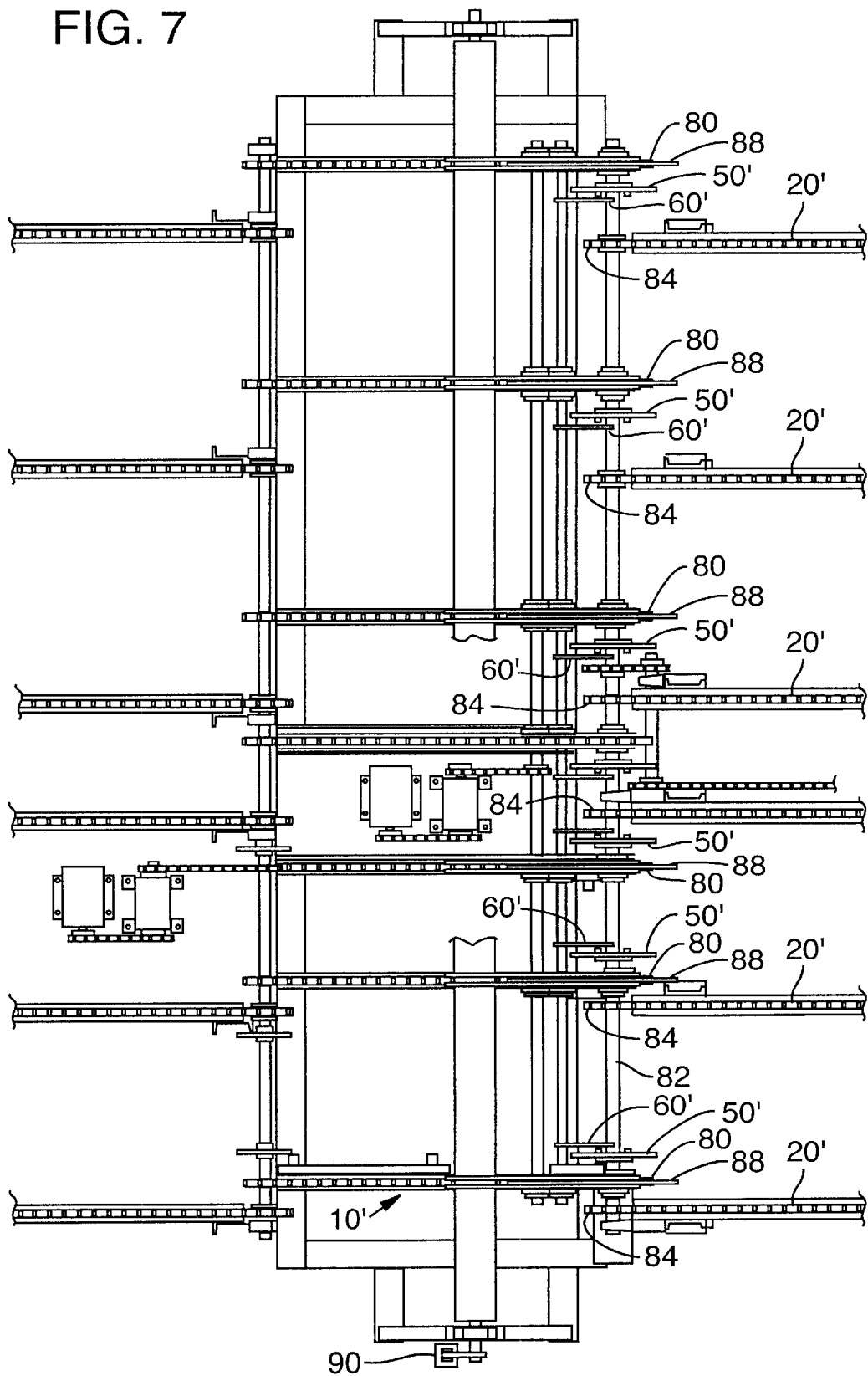

Reference is now made to FIGS. 6 and 7 for description of the further embodiment of the invention. The modified conveyor 101 follows a downwardly curved path from left to right as indicated in FIG. 6. The return path for conveyor 10' is dictated by rear end gear 80 mounted on axle shaft 82. Mounted on the same axle 82 is front end gear 84 of conveyor 20'. Cam members 50' are also mounted on axle 82.

A stop 86 is strategically positioned along the path of the conveyor 10' and into the path of boards 14 thereon. Cam members 50' are configured and sized to provide for the lifting extensions or lobes 51 of cam members 50' to engage the leading end of the board 14 abutted against stop 86 and to lift the leading edge of the board over the stop 86. The pushing force of the following board (gravity and movement of conveyor 10') forces said leading board over the stop and onto the second conveyor 20' in the manner described previously for the first embodiment.

The hold down member 88 (a pivoting lever) for this further embodiment is shown in both operative and retracted positions which is positioned by operation of cylinder 90. In the operative position, the hold down mechanism 88 confines all but the leading board 14 on the conveyor 10'. The forwardly projected end 92 of the mechanism 88 is configured and operates to partially confine the leading board (abutting stop 86) but allows the leading edge of that board to be raised by the cam extension or lobes 51. As in the first embodiment, a pivotal stop arm 60' is selectively actuated by cylinder 66' to stop the flow of boards toward stop 86, i.e., the boards are held back out of the rotational path of the lobes 51.

The further embodiment is believed to have a number of advantages over the first preferred embodiment. Other embodiments will occur to those skilled in the art and it is to be understood that such modifications and variations may be made without departing from the true spirit and scope of the invention. The invention is therefore not to be limited to the embodiments described and illustrated but is to be determined from the appended claims and specifically these claims are not intended to be interpreted as means plus function claims under 35 USC §112 ¶6.

The invention claimed is:

1. A board feeder comprising:
  a first conveyor defining a board discharging position at a discharge end, said first conveyor conveying boards in edge-to-edge relation and defining a descending path for multiple of said boards leading to the board discharging position at said discharge end, a second conveyor defining a board receiving position at a receiving end, said second conveyor conveying boards in spaced relation, said receiving position spaced proximate to the discharge position of the first conveyor, and a stop provided at said discharge position that engages the leading edge of a leading board of said multiple of said boards and stops movement of the boards from the first conveyor toward the second conveyor; and
  a lift member that moves into and out of lifting engagement with the bottom only of a leading edge of a leading board engaging the stop to lift the leading edge above the stop, said first conveyor urging continued movement of the multiple of said boards to move the leading board over the stop and onto the receiving position of said second conveyor.

2. A board feeder as defined in claim 1 wherein the release member is a rotating wheel having a periphery, and camming lobes formed on the periphery that sequentially engage a leading edge of a board that is engaging the stop to lift the leading edge over the stop.

3. A board feeder as defined in claim 2 wherein the rotating wheel is driven by the second conveyor.

4. A board feeder as defined in claim 3 wherein the second conveyor includes spacing lugs, and the lobes of the rotating wheel are arranged on the wheel in relation to the lugs on the second conveyor to produce feeding of the boards between the lugs on the conveyor during operation of the second conveyor.

5. A board feeder as defined in claim 1 wherein a hold down mechanism is provided for holding the boards following said leading board against the discharge end as the leading board is lifted over the stop.

6. A board feed comprising:
- a first conveyor defining a discharge end, said first conveyor conveying boards in edge-to-edge relation and defining a descending path for multiple of said boards leading to a board discharging position at said discharge end;
- a second conveyor defining a board receiving position at a receiving end, said conveyor configured to convey boards in a desired spaced relationship;
- said discharge end of said first conveyor and said receiving end of said second conveyor in overlapped relation whereby boards discharged from said board discharging position are directly discharged onto said board receiving position;
- a stop member positioned in the path of the boards being conveyed along said descending path that engages a leading edge of a leading board and stops movement of the boards whereby the first conveyor continuously urges movement of the boards against the stop; and
- a lift member cyclically engaging and lifting the leading edge of each board that engages the stop member to lift the leading edge of the board above the stop, said first conveyor by urging movement of the following boards thereby urging the leading board over the stop and onto the second conveyor to thereby place the boards onto the second conveyor in the desired spaced relationship.

7. A board feeder as defined in claim 6 wherein the lift member is a wheel having lobes, said wheel rotated under the stop member with the lobes engaging and lifting the boards over the stop member in sequence.

8. A board feeder as defined in claim 6 wherein a board hold down mechanism comprises a pivotal lever that pivots to a position imposed over the boards along the descending path for holding the boards onto the conveyor as the lift mechanism sequentially lifts each board engaging the stop member.

* * * * *